UNITED STATES PATENT OFFICE.

MICHAEL JLJINSKY, OF CREFELD, GERMANY.

ANTHRACHINONE DISULFONIC ACID.

No. 851,423.   Specification of Letters Patent.   Patented April 23, 1907.

Application filed November 18, 1904. Serial No. 233,355.

*To all whom it may concern:*

Be it known that I, MICHAEL JLJINSKY, chemist, a resident of Crefeld, Südstrasse 7, in the German Empire, a subject of the Russian Emperor, have invented a new Anthrachinone Disulfonic Acid, of which the following is a specification.

In my application, Ser. No: 165426, filed July 14, 1903, I have described a process of sulfonating anthrachinone or other organic bodies, especially anthracene derivatives, in the presence of mercury (as such or in the form of mercury compounds), by which process the sulfo group or groups enter in other positions than by the sulfonating process only by means of sulfuric acid. I have found that by this process the new 1-7-anthrachinone disulfonic acid is obtained by treating anthrachinone or anthrachinone mono-meta-sulfonic acid with sulfuric acid in the presence of mercury, as may be illustrated by the following examples.

Example I 100 parts of anthrachinone 1.5 parts of mercury sulfate. 200 parts of fuming sulfuric acid of 40% free $SO_3$ are slowly heated to about 160° C and kept at this temperature for an hour. The sulfonated mixture, on cooling, represents a homogenous tenacious mass and is very easily soluble in water. The sulfonic acids formed are transferred into salts of lime, whereupon the solution of the lime salts is freed of gypsum and concentrated. As principal product there results the lime salt of the new 1-7-anthrachinone disulfonic acid, which lime salt is characterized by being dissolved very easily in hot water.

In place of the anthrachinone the anthrachinone meta-mono-sulfonic acid may be employed, whereby of course a smaller quantity of fuming sulfuric acid is necessary. Consequently for the present invention anthrachinone meta-mono-sulfonic acid is to be considered to be equivalent to anthrachinone.

Example II. 100 parts of anthrachinone-meta-sulfonic acid sodium. 1.5 parts of mercury sulfate 150 parts of fuming sulfuric acid of 40% free $SO_3$ are slowly heated to about 160° C and kept at this temperature for an hour. The cold, syrup-like mass is dissolved in water, neutralized with chalk and the solution, freed of gypsum, is concentrated.

There results as the principal product, as according to Example I the lime salt of the new 1-7-anthrachinone disulfonic acid, such lime-salt being very soluble in hot water.

The new acid forms a sodium salt, which is different from the sodium salts of the known anthrachinone 2.6-disulfonic acid and anthrachinon 2.7 disulfonic acid, as may be seen from the annexed table.

|  | Sodium salt of the known anthrachinone 2.6 disulfonic acid, obtained by sulfonating anthrachinone 2 mono-sulfonic acid sodium without the employment of mercury. | Sodium salt of the known anthrachinone 2.7-disulfonic acid obtained by sulfonating anthrachinone a mono-sulfonic acid sodium without the employment of mercury. | Sodium salt of the new 1.7 acid, obtained by treating anthrachinone 2-mono-sulfonic acid with sulfuric acid in the presence of mercury |
|---|---|---|---|
| Appearance | Crystalline powder | Fine needles | Crystalline powder |
| Solubility | 1 gr. dissolves in 10 ccm of water remains in solution in cooling. | 1 gr. dissolves in 2 ccm. of water and remains in solution in cooling. | 1 gr. dissolves in 3 ccm. water, the solution gives in cooling a bulk of fine needles. |
| Behaviour of a 5 per cent solution with chloride of barium. | Immediate strong precipitation insoluble in heat also in diluted hydrochloric acid. | Immediate strong precipitation, insoluble in heat, also in diluted hydrochloride acid. | Immediate gelatinous precipitation, insoluble in heat and also in diluted HCl. |
| Chloride of calcium | do | After some time precipitation of fine needles, remaining insoluble. | No precipitation. |
| Sulfate of copper | No precipitation | No precipitation | Do. |
| Acetate of lead | No precipitation: by adding diluted nitric acid strong crystalline separation, insoluble in heat. | No precipitation also in adding diluted nitric acid. | No precipitation also in adding diluted nitric acid. |
| Addition of a like volume of conc. HCl. | Crystalline separation soluble in boiling. | No precipitation | After standing a long time crystalline separation. |
| In melting with lime yields | Anthraflavin acid | Isoanthraflavi.. acid | Metabenz-dioxyanthrachinone. |

The new acid is to be used to obtain the corresponding useful oxy-anthrachinone and important dye-stuffs.

I claim as my invention

The new and useful anthrachinone-disulfonic acid characterized by having the sulfo-groups in the position 1.7, and giving a sodium salt crystallizing in fine needles on cooling from hot solution and yielding in melting with lime metabenz-dioxyanthrachinone.

In testimony whereof I have signed my name to this specification, in the presence of two subscribing witnesses.

MICHAEL JLJINSKY.

Witnesses:
W. BRUCE WALLACE,
MARGARET WALLACE.

---

Corrections in Letters Patent No. 851,423.

It is hereby certified that Letters Patent No. 851,423, granted April 23, 1907, upon the application of Michael Jljinsky, of Crefeld, Germany, for an improvement in "Anthrachinone Disulfonic Acid," were erroneously issued to "said Jljinsky" as owner of said invention; whereas said Letters Patent should have been issued to *R. Wedekind & Co., of Uerdingen on the Rhine, Germany*, as assignee of the entire interest in said patent, as shown by the record of assignments in this office; and that the said Letters Patent should be read with this correction therein that the same may conform to the record of the case in the Patent Office.

Signed and sealed this 30th day of July, A. D., 1907.

[SEAL.]

C. C. BILLINGS,
*Acting Commissioner of Patents.*

The new acid is to be used to obtain the corresponding useful oxy-anthrachinone and important dye-stuffs.

I claim as my invention

The new and useful anthrachinone-disulfonic acid characterized by having the sulfogroups in the position 1.7, and giving a sodium salt crystallizing in fine needles on cooling from hot solution and yielding in melting with lime metabenz-dioxyanthrachinone.

In testimony whereof I have signed my name to this specification, in the presence of two subscribing witnesses.

MICHAEL JLJINSKY.

Witnesses:
W. BRUCE WALLACE,
MARGARET WALLACE.

---

Corrections in Letters Patent No. 851,423.

It is hereby certified that Letters Patent No. 851,423, granted April 23, 1907, upon the application of Michael Jljinsky, of Crefeld, Germany, for an improvement in "Anthrachinone Disulfonic Acid," were erroneously issued to "said Jljinsky" as owner of said invention; whereas said Letters Patent should have been issued to *R. Wedekind & Co., of Uerdingen on the Rhine, Germany*, as assignee of the entire interest in said patent, as shown by the record of assignments in this office; and that the said Letters Patent should be read with this correction therein that the same may conform to the record of the case in the Patent Office.

Signed and sealed this 30th day of July, A. D., 1907.

[SEAL.]

C. C. BILLINGS,
*Acting Commissioner of Patents.*

It is hereby certified that Letters Patent No. 851,423, granted April 23, 1907, upon the application of Michael Jljinsky, of Crefeld, Germany, for an improvement in "Anthrachinone Disulfonic Acid," were erroneously issued to "said Jljinsky" as owner of said invention; whereas said Letters Patent should have been issued to *R. Wedekind & Co., of Uerdingen on the Rhine, Germany*, as assignee of the entire interest in said patent, as shown by the record of assignments in this office; and that the said Letters Patent should be read with this correction therein that the same may conform to the record of the case in the Patent Office.

Signed and sealed this 30th day of July, A. D., 1907.

[SEAL.]                                             C. C. BILLINGS,
*Acting Commissioner of Patents.*